(12) United States Patent
Walter

(10) Patent No.: US 7,615,727 B2
(45) Date of Patent: Nov. 10, 2009

(54) APPLIANCE FOR HEATING MEALS

(75) Inventor: Hubert Eric Walter, Neu Ulm (DE)

(73) Assignee: MGS Modular Galley Systems AG, Elchingen (DE)

( * ) Notice: Subject to any disclaimer, the term of this patent is extended or adjusted under 35 U.S.C. 154(b) by 384 days.

(21) Appl. No.: 10/546,476

(22) PCT Filed: Feb. 24, 2004

(86) PCT No.: PCT/DE2004/000396

§ 371 (c)(1),
(2), (4) Date: May 22, 2006

(87) PCT Pub. No.: WO2004/075703

PCT Pub. Date: Sep. 10, 2004

(65) Prior Publication Data

US 2006/0219704 A1 Oct. 5, 2006

(30) Foreign Application Priority Data

Feb. 25, 2003 (DE) ................. 103 09 506

(51) Int. Cl.
*H05B 6/12* (2006.01)
(52) U.S. Cl. ..................... 219/622; 219/620
(58) Field of Classification Search ............... 219/622, 219/621, 620, 623, 624, 625, 626, 627
See application file for complete search history.

(56) References Cited

U.S. PATENT DOCUMENTS

| | | | |
|---|---|---|---|
| 4,490,602 A * | 12/1984 | Ishihara | ................. 392/379 |
| 5,466,915 A | 11/1995 | Meier et al. | |
| 5,954,984 A | 9/1999 | Ablah et al. | |
| 6,318,246 B2 * | 11/2001 | Fukushima et al. | ........... 99/330 |
| 6,359,268 B1 * | 3/2002 | Walter | ........................ 219/622 |

FOREIGN PATENT DOCUMENTS

| | | |
|---|---|---|
| DE | 295 04 256 | 5/1995 |
| DE | 295 08 306 | 8/1995 |
| DE | 198 18 831 A1 | 10/1999 |
| DE | 100 11 773 | 9/2001 |
| EP | 0 818 169 A | 1/1998 |

\* cited by examiner

*Primary Examiner*—Daniel L Robinson
(74) *Attorney, Agent, or Firm*—Davis & Bujold, P.L.L.C.

(57) ABSTRACT

The invention relates to a device for heating up meals. It comprises a housing which can be closed by means of a door and shields the surroundings from electromagnetic waves. One or more functional trays which contain one or more induction coils are held within the housing, in order to be able to inductively heat up meals held in containers so that they can be consumed. The object of the invention is to increase the operational reliability of a device of this type. According to the invention, an electrically conducting element is therefore present on end faces of functional trays which are oriented in the direction of a door opening in the housing. Each individual electrically conducting element is also connected to the local potential, housing potential and/or ground potential, in order to be able to ensure that the surroundings are shielded from electromagnetic waves, even when the housing door is open.

31 Claims, 7 Drawing Sheets

Insert element

Cavity for evaporation

APPLIANCE FOR HEATING MEALS

This is a nationalization of PCT/DE04/000396 filed Feb. 24, 2004 and published in German.

The invention relates to a device for heating up meals. The device comprises a housing which can be closed by means of a door and shields the surroundings from electromagnetic waves. One or more functional trays are held in the interior of the housing. There are, in turn, one or more induction coils in a functional tray of this type. Heating can be performed within the alternating electromagnetic fields of the induction coils when articles (for example containers), which are suitable for this purpose and are at least partially composed of materials which can be inductively heated up or substances of this type, are arranged within said fields.

The invention is particularly suitable when pre-prepared meals which are to be consumed have to be heated up quickly and with increased energy efficiency and increased quality. Areas of use particularly predetermined for this are, for example, hospitals and also vehicles, preferably aircraft. However, increased requirements in terms of undesirable electromagnetic fields or waves are placed on the devices in these areas since these fields or waves may have an undesirable effect on electronic devices and this, in turn, may lead to damage to the devices or the vehicles or else to human health or life.

Although this problem can be solved using known solutions, as described in DE 198 18 831 A1 for example, by means of a metallic housing in the majority of cases, the door region remains critical. It is therefore necessary to ensure that no electromagnetic waves can ever escape from the gaps around the door or to be absolutely sure that no such waves are emitted from open door openings.

Known solutions to this problem also have disadvantages in terms of handling for the operator and meals being selectively heated up in a very largely automated manner.

Localized overheating can be prevented only with difficulty and ineffectively, and so at least the quality of the meals which are heated up may be impaired.

The object of the invention is therefore to propose possible ways in which the operational reliability of devices for inductively heating up meals can be increased.

According to the invention, this object is achieved by a device which has the features of claim 1.

Advantageous refinements and developments can be achieved with the features mentioned in the dependent claims.

The device according to the invention has a housing which, apart from a door opening which can be closed, is closed and is formed in such a way that electromagnetic waves, which are emitted by induction coils for heating up meals or else by other generating electromagnetic waves for example, are shielded, and it is accordingly possible to prevent them having any effect outside the device. The entire housing or just an inner wall may therefore be composed of a suitable material.

In order to prevent electromagnetic waves undesirably escaping into the surroundings through the door region, both when the door is open and when it is closed, electrical conductors, which are arranged on functional trays which contain induction coils, are provided according to the invention.

At least one electrical conductor can be provided on an end face, which points in the direction of the door, of a functional tray. One or each of a plurality of electrical conductors has to be connected to the local potential, housing potential and/or ground potential in order to maintain an equipotential, so that said electrical conductor also forms a shield for electromagnetic waves in conjunction with the shielding housing. The respective potential connection depends substantially on where the device is used.

The electrical conductors should be routed over the entire length of an end face of a functional tray. They should also advantageously be routed at least further along the adjoining side faces which are oriented in the direction which is orthogonal to the end face.

The electrical conductors can be fixed to the respective functional tray by interlocking, force-fitting or cohesive bonding, combinations of these types of connection also being possible.

The electrical conductors may be in the form of metal profiles, for example angled or U-profiles, integrated in this region of functional trays, or applied in the form of an electrically conducting coating.

However, it is also possible to fix electrical conductors to the inner face of a door, so that when the door is closed they are positioned in relation to end faces of functional trays and can fulfill their shielding effect.

It is not absolutely necessary to provide a shielding electrical conductor on each functional tray within a device, but it is instead sufficient for minimum separations to be complied with. The maximum distance between an electrical conductor and the housing or else an adjacent electrical conductor should therefore not be greater than 500 mm, preferably not greater than 300 mm.

The distance should also not be greater than $\frac{1}{3}$, preferably $\frac{1}{5}$, of the antenna separation specified in EURO CAE ED-14 D/RTLA DO-160 (C, D or E), section 21.

This can be readily implemented when a plurality of functional trays are securely installed in a device.

It is advantageous for the functional trays to be designed such that they can be removed, particularly to facilitate cleaning of the interior of the device and the functional trays. Functional trays formed in this way can be inserted or removed through the door opening. Therefore, guide and/or supporting rails for the functional trays may be present on the inner wall of the device. The housing then contains connecting elements for each of the individual functional trays, and connecting elements which complement the aforementioned connecting elements, for example corresponding connector strips, are present on the functional trays. The connection can be made when functional trays are inserted, so that the functional trays are electrically connected to a power supply system and also to an electronic control system. A connection of this type can then also be used to maintain the equipotential to the electrical conductor.

Interchangeable functional trays of this type which can be inserted one above the other in a plurality of levels within a device also increase the operational flexibility. It is therefore possible to keep some levels free and accordingly heat up meals contained in tall containers.

The functional trays may advantageously be formed in such a way that the one or more induction coil or coils is/are held between planar plate-like elements, which are made from a thermostable material, from above and below so as to be watertight on all sides. This material may be a thermostable plastic, a ceramic or mica, for example. In addition to the temperature resistance, this material should be easy to clean and fulfill the requirements for food hygiene.

At least one planar, flat shielding element may additionally be arranged in the interior of the device. It may be composed of a purely ferritic material or a material which contains ferrites. It is thus possible to achieve direction-specific shielding for electromagnetic waves.

An element of this type may be arranged on the floor of the device, for example. However, shielding elements may also be arranged above or below functional trays. It goes without saying that shielding elements should not be arranged directly above a functional tray, at least not when it is to be used. It is possible to arrange said elements directly below functional trays however. It is even possible for a shielding element arranged in this way to be an integral component of a functional tray.

Electrically conducting elements or regions, which can be heated up by the influence of alternating electromagnetic fields and/or by induction coils heating up in a parasitic manner, can also be provided on the surface of functional trays. This heat can be used to heat up towels or baked goods at a somewhat lower temperature or power than meals which are to be heated up. However, the inner wall of the device can also be heated up by thermal conduction, and this may be advantageous, for example, for catalytic self-cleaning of the interior. Also, bacteria or other germs can therefore be killed when a temperature of 100° C. is reached or exceeded.

One or more induction coils can be arranged within a functional tray and electrically connected up in a very wide variety of ways. The induction coils may each have identical electrical and electromagnetic parameters. A plurality of induction coils be connected in series and/or in parallel.

Although these preconditions are met, the individual induction coils or else series connections of induction coils are not uniformly electrically loaded when meals are heated up. The respective load is also influenced by the electrical properties of the respective containers which contain the meals. It is also necessary to take into account the fact that not all meals, which in relation to induction coils of a functional tray, have to be heated up to the same temperatures, or even have to be heated up at all.

The overheating already mentioned in the introduction should be avoided in particular. Temperature sensors or temperature sensor switching elements may therefore be present in, but also on, functional trays, these temperature sensors or temperature sensor switching elements switching off one, a plurality of or all of the induction coils of a functional tray when predefined maximum temperatures are reached. Examples of electrical or electronic elements which are suitable under these conditions and for this purpose are PTCs or bimetallic switches.

Induction coils can be switched off using sensor elements by means of an electronic control system. Sensor switching elements can switch off one or more induction coils directly.

It is advantageous to heat up containers containing meals in conjunction with insert elements, particularly in the case of embodiments of functional trays having a multiplicity of induction coils which can be used in devices with increased operational flexibility. Receptacles for containers are then formed in insert elements of this type, so that the containers can be positioned in relation to induction coils at least in two, or even better in three, dimensions. The arrangement of the receptacles can therefore be matched to the position of the induction coils, and their shape and dimensions can be matched to the respective containers. They can therefore be positioned in an optimum position of an alternating electromagnetic field of induction coils for heating up meals in a uniform, rapid and energy-saving manner.

Receptacles may be arranged on insert elements in such a way that they are not heated up there. This is possible by correspondingly positioning them outside the alternating electromagnetic fields.

Coding elements may be present on insert elements, these coding elements allowing individual recognition of the respective insert element, including its fittings or whether there are covers on insert elements or containers. In this case, the device contains detectors for the coding elements for the individual functional tray levels. After the respective insert element is recognized, meals can be heated up in a locally deliberate manner by corresponding pre-programming for this insert element, for example by switching on specific induction coils and allowing other induction coils to be switched off. It is therefore possible, for example, to either generate steam or not generate steam in a differentiated manner, with reference still to be made to possible ways of generating steam.

For the described purposes, it is also advantageous when the insert elements are inserted into a device in a defined manner and can be positioned in relation to a functional tray. For this purpose, there may be profiled elements on the inner side walls or the side edges of functional trays, into which profiled elements profiles formed on the side edges of insert elements can be inserted. It is therefore possible to achieve a specific lateral separation between or central positioning of insert elements in a very simple manner.

However, if the profiled elements and profiles are not identically formed on the diametrically opposite faces or sides or else are arranged at different distances from the edge or the inner wall, the insert elements can be inserted into the device only in one direction.

The devices according to the invention can also be developed when they can be operated in combination with a refrigeration system. In this way, it is possible to refrigerate meals in the device for specific time periods and then to heat them up later. A refrigeration system may have been integrated in the device with all the necessary components or some such components may have been formed as an additional accessory, in which case a heat exchanger can be arranged within the device for refrigeration purposes and interfaces to an external refrigeration system should be present.

There may therefore be one or more supply lines for supplying a cooling medium, preferably cooled air, from the outside.

The cooling medium may advantageously be passed in and through between individual, selected functional trays in a controlled manner.

The invention will be described in greater detail below by way of example.

In the drawing:

FIG. 1 shows a schematic, perspective illustration of one example of a device according to the invention;

FIG. 2 schematically shows functional trays with electrical conductors for shielding electromagnetic waves;

Figure 8:
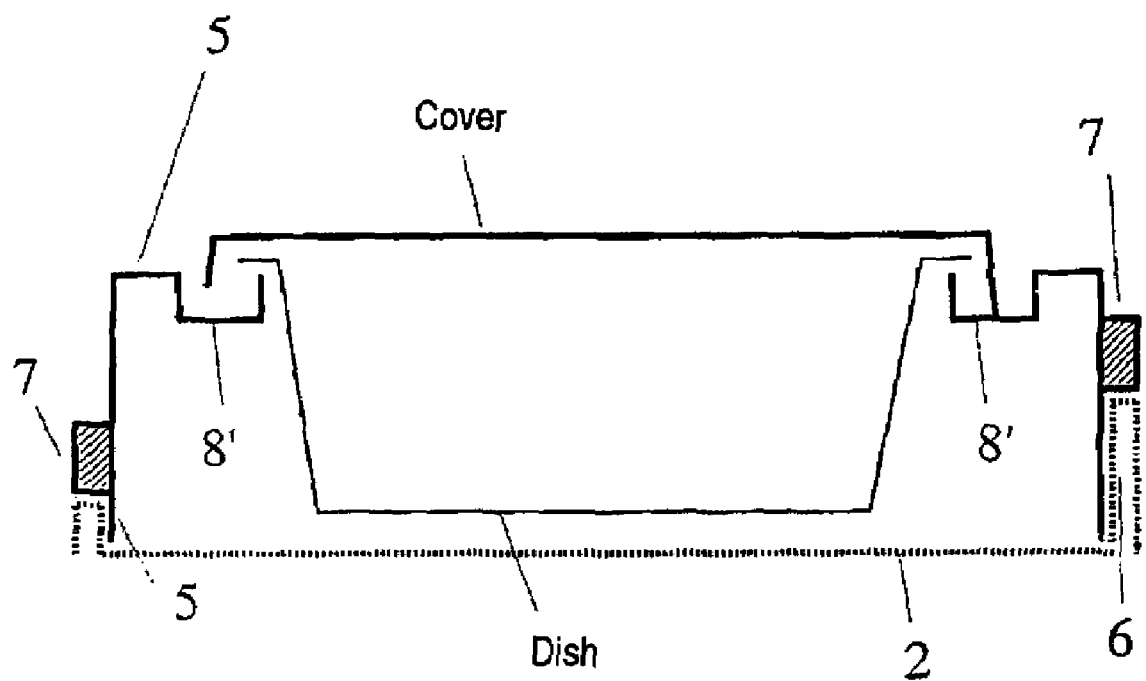

FIG. 8 schematically shows a guide for insert elements having profiled elements and profiles.

Figure 1:
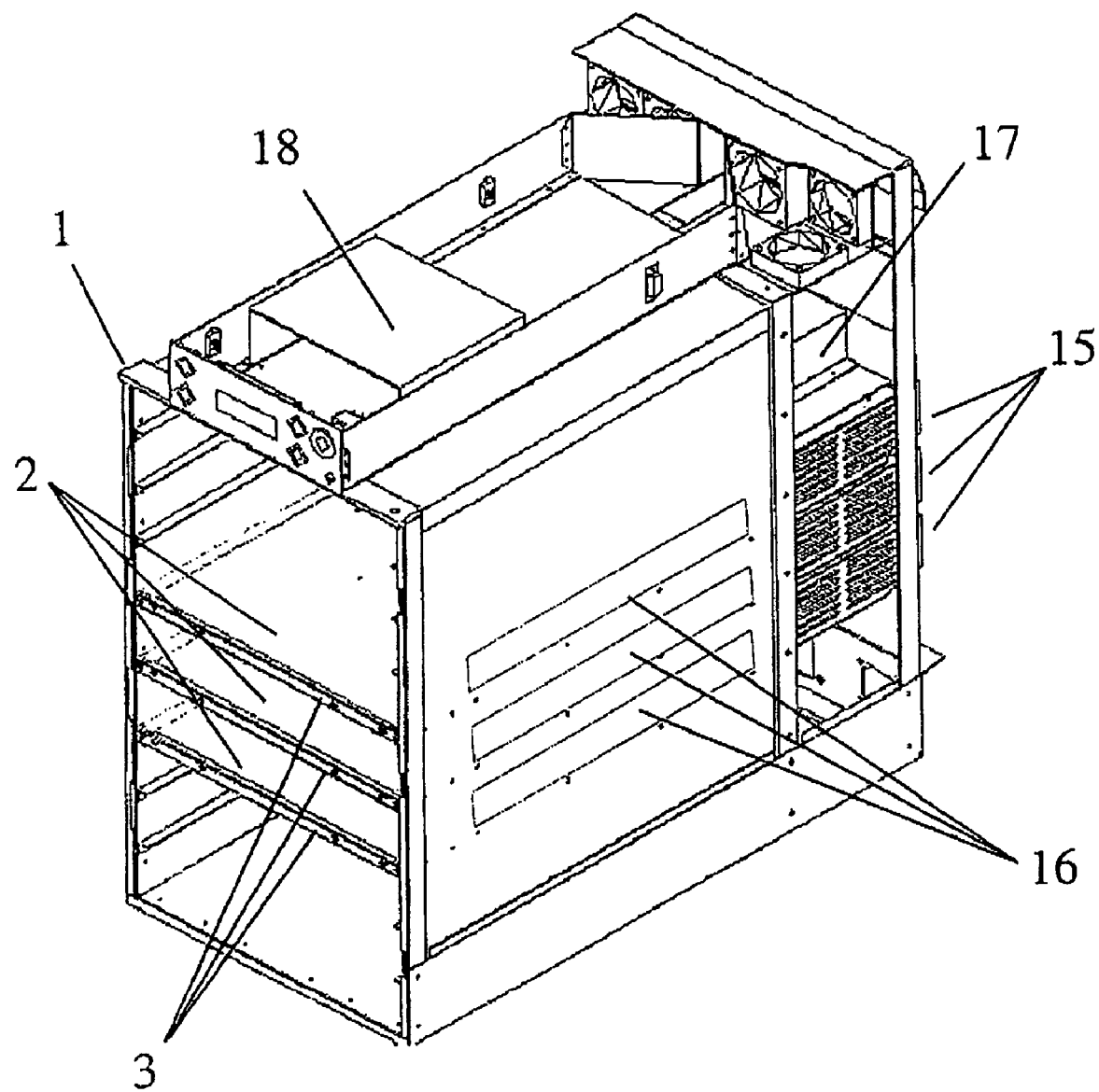

FIG. 1 schematically shows one example of a device according to the invention. In this case, three functional trays 2 are arranged one above the other and oriented horizontally within the housing 1.

Electrical conductors 3 are provided on the end faces of the functional trays 2 which point in the direction of the door opening, these electrical conductors forming a reliable shield against electromagnetic waves reaching the surroundings of the device in this direction.

In this example, a refrigeration system 17 is also integrated in the device.

Detector strips 16 having discretely arranged individual detectors are present on the housing 1 for the functional trays 2 and can be used together with coding elements 23 on insert elements 5 to identify said insert elements.

In this case, a central control system 18 is arranged in an intermediate housing.

The functional trays 2 can be removed and inserted into the device again through the door opening.

To this end, the connecting elements which are mentioned in the general part of the description and can be inserted into connecting elements on the inner wall of the housing to produce electrical connections (not illustrated) are present on the end face of the functional trays 2 which parallel to end faces with electrical conductors 3.

Figure 2:
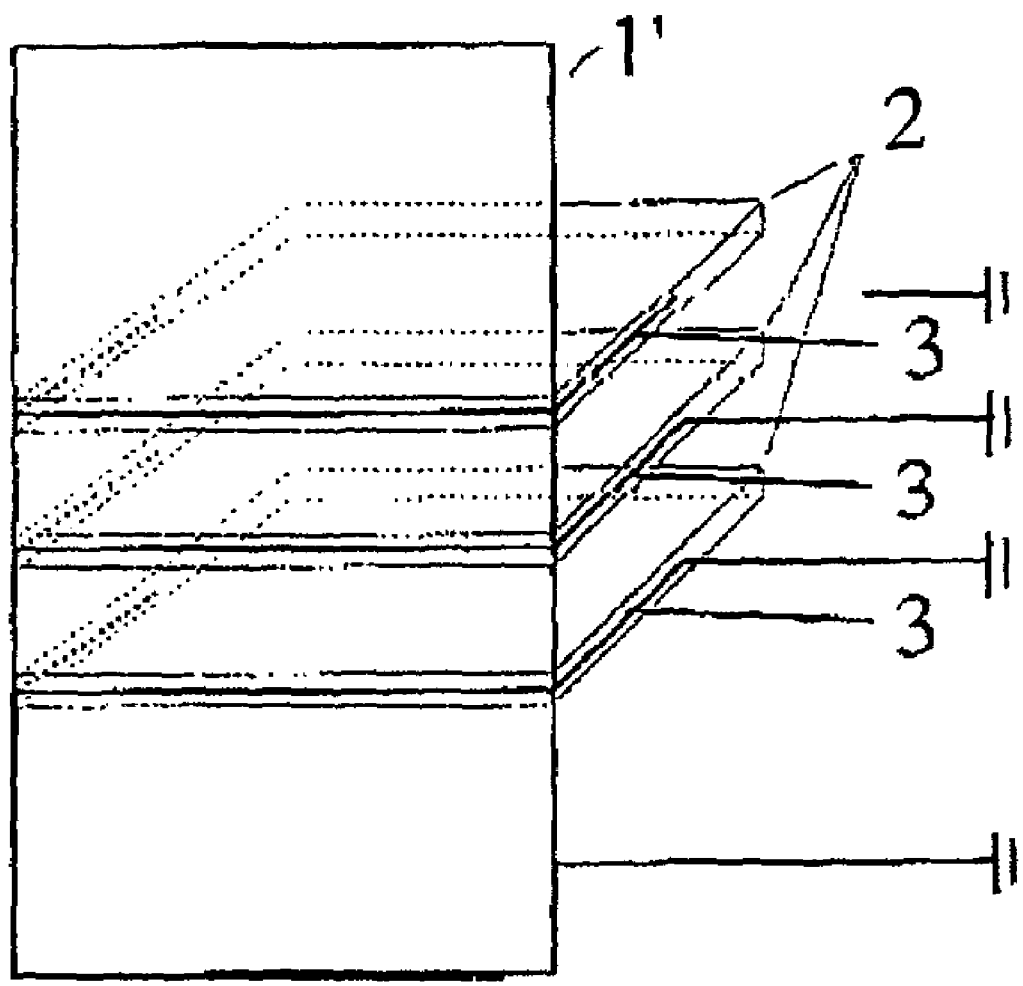

FIG. 2 schematically shows a possible arrangement and design of the electrical conductors 3 on functional trays 2 in the region of the door opening. In this case, the electrical conductors 3 are also routed along part of the side faces of the functional trays 2 and each individual electrical conductor 3 is separately connected to the local potential, housing potential or ground potential. The latter also applies for the housing 1, including the door frame 1' (illustrated here) on the device.

Figure 3:
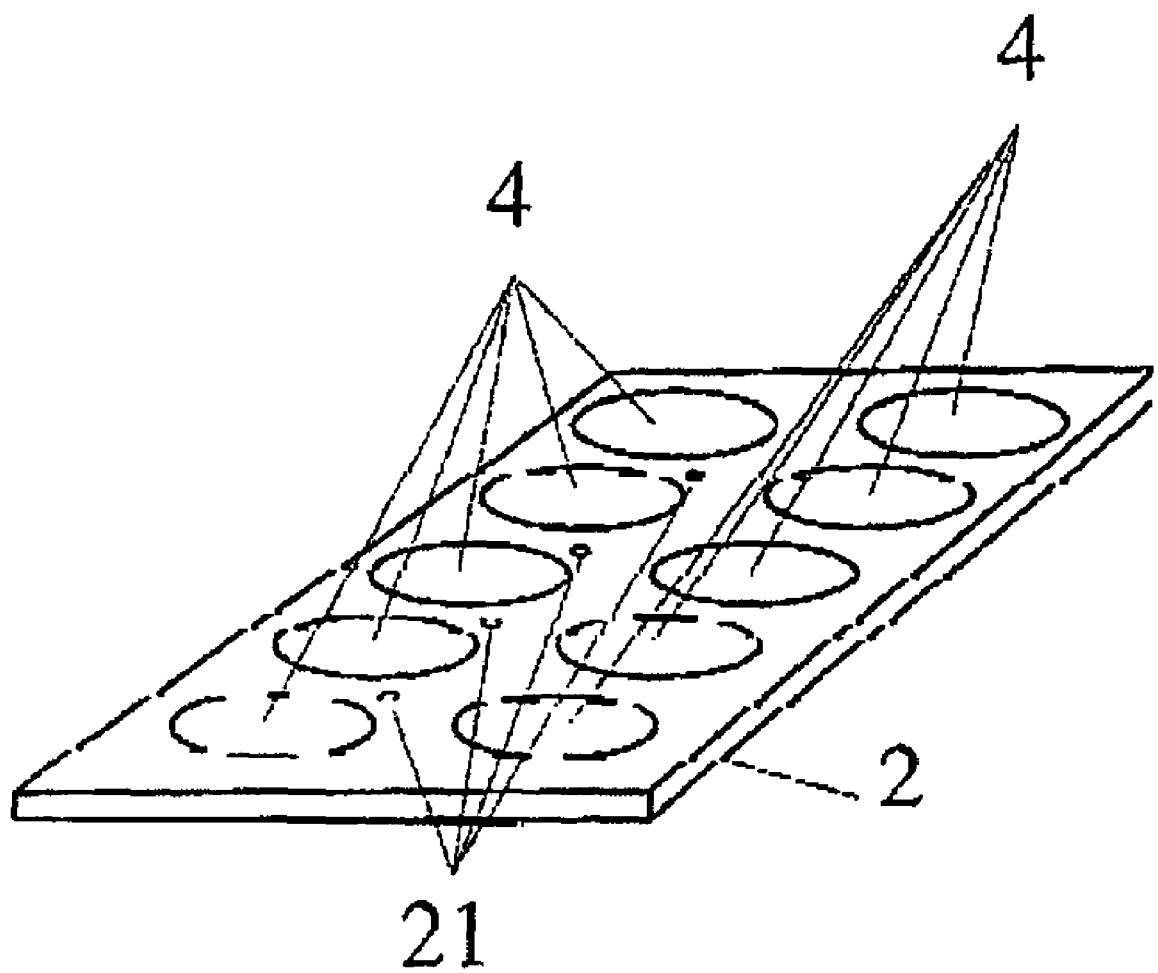
FIG. 3 shows a functional tray with induction coils.

FIG. 3 illustrates one example of the arrangement of induction coils 4 and temperature sensor switching elements 21 on a functional tray.

The induction coils 4' are arranged here in a regular pattern in two parallel rows, for example. The temperature sensor switching elements 21 are arranged between the two rows of induction coils 4. In this case, their arrangement may differ from the illustration. However, the way in which they are arranged should take into account the electrical connection of the induction coils 4 to one another.

Therefore, the series connection of in this case five induction coils or five pairs of induction coils 4, which are connected in series and are each connected in parallel to one another again, can be taken into account.

Figure 4:
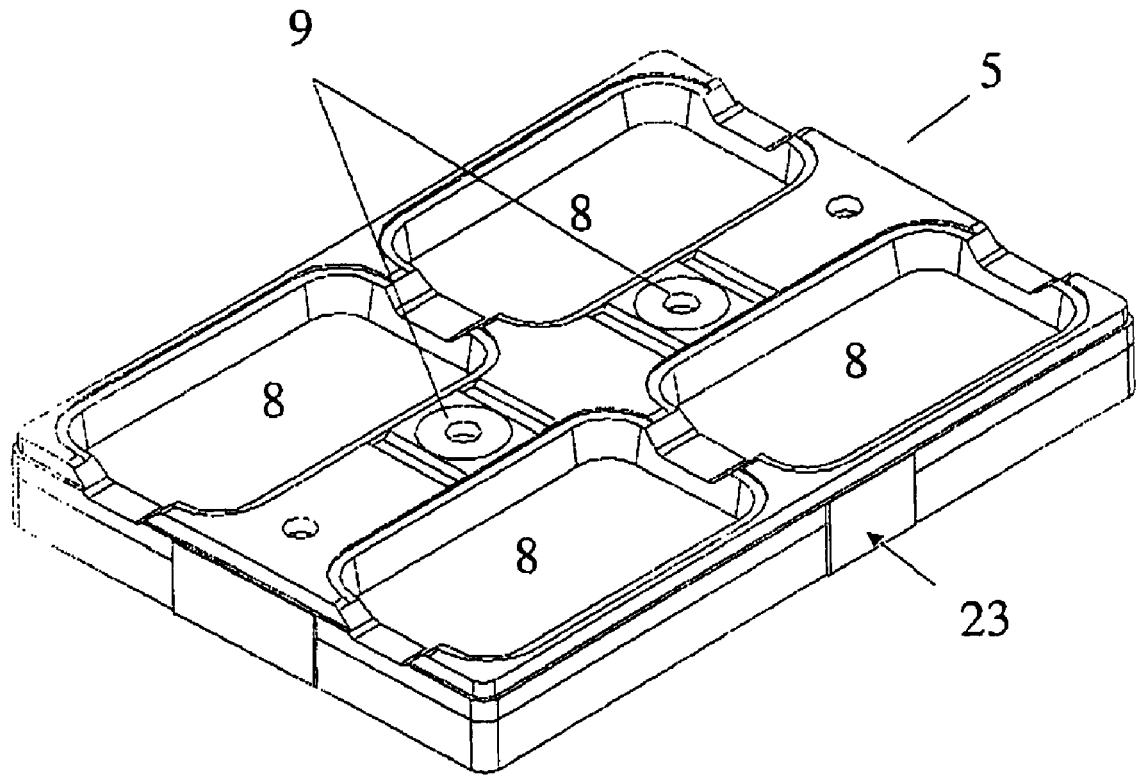
FIG. 4 shows one example of an insert element.

FIG. 4 is a perspective view of one example of an insert element 5. In this case, a total of four receptacles 8 for containers (not illustrated) containing meals to be heated up are present on the insert element 5. The containers can be inserted into these receptacles and positioned in relation to induction coils 4 of a functional tray.

A ferromagnet in the form of a coding element 23 is fixed in a predefined position on the shown insert element 5. Its position can be detected by means of the detectors of a detector strip 16 and the insert element 5 can thus be individually identified and distinguished from insert elements 5 possibly formed or fitted in a different way. However, coding elements 23 may also be in the form of reflecting elements which allow identification using discretely arranged optical detectors.

There are two cavities 9 in this insert element 5 and these can be integrated into an insert element 5 or else can be inserted into correspondingly formed receptacles. These cavities 9 can be filled with water, then likewise be heated within an alternating electromagnetic field of induction coils 4 until steam is formed.

In contrast to the examples which have been shown and described, steam can also be generated externally and/or centrally. The steam can then be passed to the interior of the device via one feed line, preferably a plurality of feed lines, which can be temporarily closed. Supply lines for each functional tray level are therefore preferred. In these cases, there may be couplings on covers 10 for connection to steam feed lines and the steam can be passed in an analogous manner via channels 11 within an insert element 5 closed by a cover 10.

This steam can at least assist in heating up meals, it being possible to use the steam to increase the quality of heated-up meals.

Figure 5:
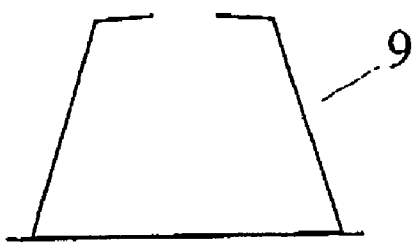
FIG. 5 shows one example of a cavity for generating steam.

A section through a cavity 9 of this type is schematically illustrated in FIG. 5. The example shown has an opening at the top to allow steam to escape and to fill said cavity with water. The lower base here is formed from an electrically conducting material which can be inductively heated, but may also be correspondingly coated.

Figure 6:
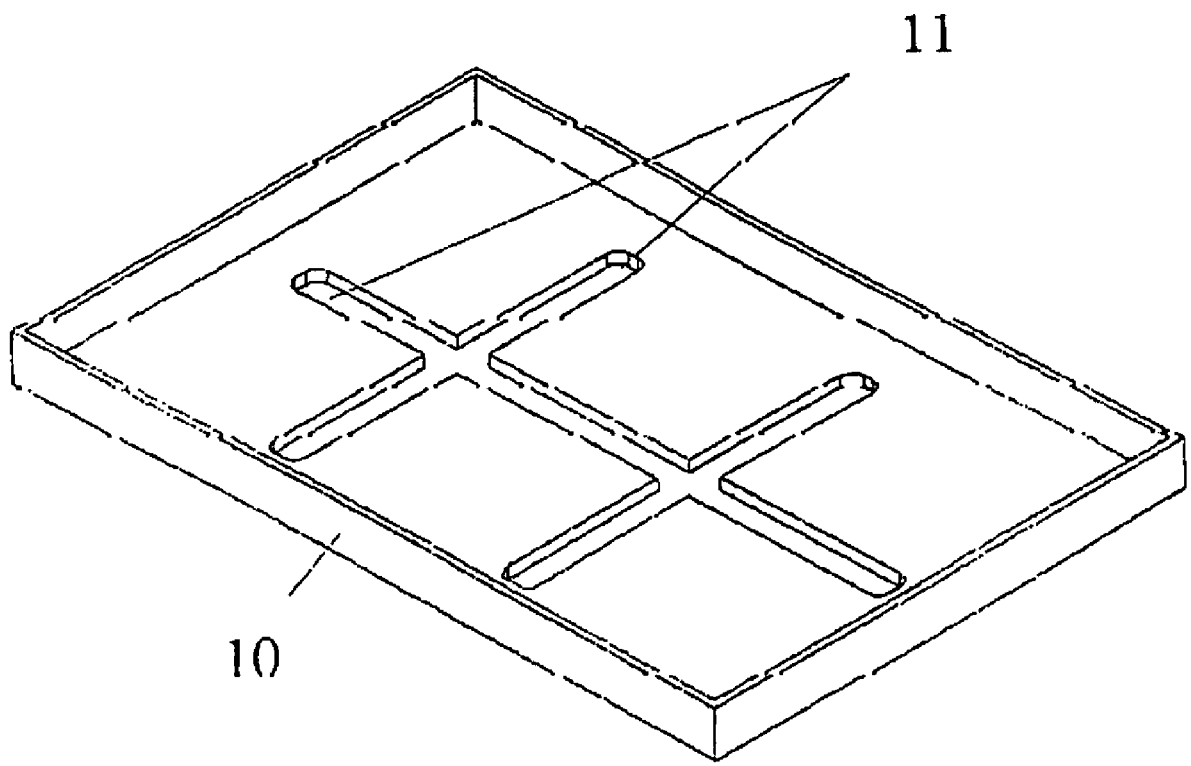
FIG. 6 shows one example of a cover for insert elements.

Such an arrangement and design of cavities 9 and insert element 5 should be used in conjunction with a cover 10 as far as possible, as shown likewise by way of example in FIG. 6.

Channels 11 are formed on the lower side of the cover 10. The steam emerging from the cavities 9 can be passed through these channels 11, to the meals to be heated up, when the cover 10 with the downwardly pointing, open channels 11 has been fitted on an insert element 5, so that steam can be passed through the channels 11 directly to the meals which are to be heated up and are arranged in containers fixed in receptacles 8.

Insert elements 5 and covers 10 should be formed in such a way that they can be detachably connected to one another, with the intention being to produce a relatively tight seal when the cover 10 is fitted on an insert element 5. To this end, the cover 10 and insert element 5 may be provided with a suitable edge contour.

However, it should also be possible for the two elements to be connected to one another as far as possible in the opposite sense, that is to say for the cover 10 to be fixed to the insert element 5 in an interlocking manner from below.

It is also advantageous when covers 10 with insert elements 5 connected can be stacked one above the other in several layers and slipping within or of one complete stack of this type is at least impeded by the edge and/or surface contours of covers and insert elements 5.

Figure 7:
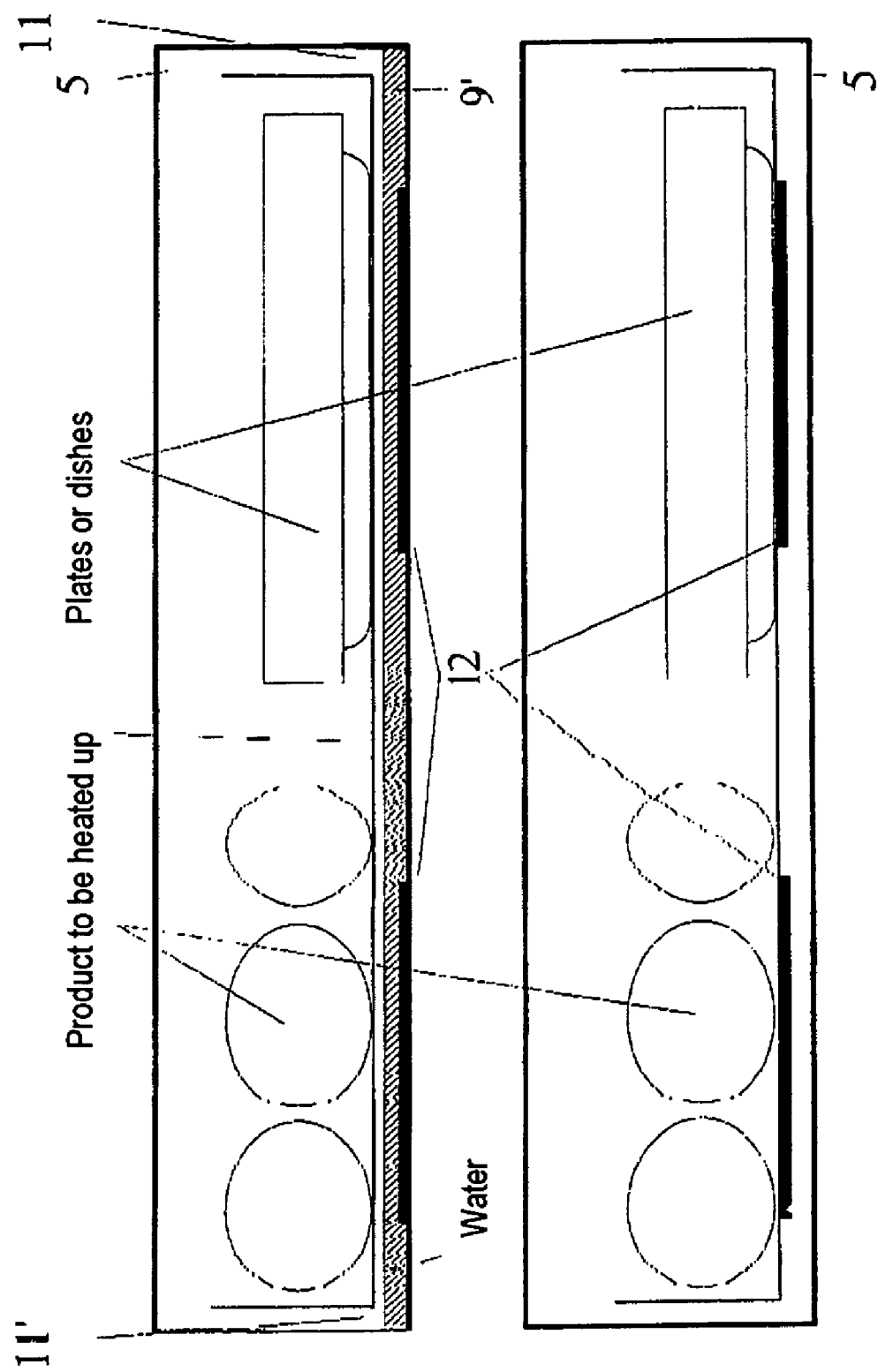
FIG. 7 shows two further examples of insert elements.

FIG. 7 schematically shows a lateral section illustration through two examples of insert elements 5.

In the upper illustration in FIG. 7, electrically conducting elements 12, in which eddy currents can be induced for heating purposes, are arranged on the base of an insert element 5. These elements 12 are arranged within a cavity 9' which is open by means of channels 11' and can be filled with water, so that steam is generated during heating and this steam can be used to heat up meals or to heat up and moisten towels.

In the lower illustration, the elements 12 are arranged on the base, but they can also be temporarily fixed there.

Articles (illustrated on the left-hand side) which are to be heated up or containers (illustrated on the right-hand side) which contain meals and are composed of a material which cannot be inductively heated or can be only poorly inductively heated (for example uncoated porcelain, plastic) can then be placed above these electrically conducting elements 12.

The electrically conducting elements 12 may also be in the form of films or foils, emulsions or layers.

The intention in FIG. 8 is to clearly show the defined insertion of insert elements 5 into a device according to the invention in a highly schematic form.

In this case, there are profiled elements 6 on the opposite sides of the inner wall of the housing 1 or on a functional tray 2. Downwardly directed open profiles 7 into which the profiled elements 6 can engage are formed on the outer edges of an insert element 5 in the insertion direction along the corresponding outer edges. It is therefore possible to insert insert elements 5 above a functional tray 2 into a device according to the invention in a defined manner on the correct side and to precisely position in three dimensions meals to be heated up, in order to generate steam and/or heat up articles within alternating electromagnetic fields.

One advantageous embodiment of insert elements 5 can also be explained using FIG. 8.

In this case, a profiled section 8' which surrounds a receptacle 8 are formed on said receptacle and here may be in the form of a circumferential u-shaped groove.

As shown in FIG. 8, it is therefore possible for dishes which can be closed by a cover to be inserted into a receptacle 8 of insert elements 5. An edge which projects from the circumference of the container/dish can rest on part of the circumferential profiled section 8' here, so that the dish/container is kept at a specific distance above a functional tray 2. The abovementioned optimum positioning within an alternating electromagnetic field can thus be ensured.

The circumferential profiled section 8' may be designed and dimensioned in such a way that a cover is raised when the dish/container is inserted into a receptacle 8, and a chance to supply steam is thus created.

Steam can then be introduced through a gap between the inner circumferential edge of the profiled section 8' and the edge of the cover.

Another possible way of supplying steam is indicated on one side of the illustration from FIG. 8.

In this case, the cover which closes or else covers the dish/container does not extend directly as far as the base of the circumferential profiled section 8', so that steam can pass through the gap there into the interior of a dish/container.

As indicated in FIG. 8, the formation of gaps at the lower edge of a cover only in regions may be sufficient to be able to provide openings for the introduction of steam into the interior.

The invention claimed is:

1. A device for heating up meals, in which at least one functional tray is arranged within a housing which is closed by a door and has a shielding effect for electromagnetic waves, where functional trays (2) each contain at least one induction coil (4) for producing an alternating electromagnetic field within which heating is achieved, wherein an electrically conducting element (3) is located at least along an end face of at least one of the functional trays (2), which is oriented adjacent the door opening in the housing (1), and the at least one electrically conducting element (3) is respectively connected to at least one of a local potential, a housing potential and a ground potential and one of the local potential, the housing potential and the ground potential being coupled to the electrically conductive element (3), when the at least one functional tray (2) is accommodated within the housing (1) and the door is in its closed position, so that the door forms a shield for electromagnetic waves and minimizes passage of otherwise errant electromagnetic waves through the door.

2. A device for heating meals, the device comprising:

a housing (1) having first and second opposed side walls, a door opening and a door for matingly engaging with the door opening, the door when in an open position, facilitates access to an interior of the housing (1) and the door when in an closed position, prevents access to the interior of the housing (1), each of the first and the second side walls have at least one support rail;

at least one functional tray (2) having opposed first and second ends and first and second side edges, the at least one functional tray (2) is insetable into the interior of the housing (1) through the door opening such that the first side edge engages the support rail of the first side wall and the second side edge engages the support rail of the second side wall so that the at least one functional tray (2) is releasably supported within the interior of the housing (1), and the at least one functional tray (2) containing at least one induction coil (4) for generating an alternating electromagnetic field and producing heat;

an electrically conductive element (3) being fixed along at least the first end the at feast one functional tray (2) adjacent the door opening and the door of the housing (1); and at least one of a local potential, aground potential and a housing potential being coupled to the electrically conductive element (3), when the at least one functional tray (2) is accommodated within the housing (1) and the door is in its closed position, for forming a barrier for electromagnetic waves.

3. The device according to claim 2, wherein the electrically conductive element (3) spans across an entire length of the first end of the at least one functional tray (2) and a further electrically conductive element (3) is fixed to and spans across an entire length of the second end of the at least one functional tray (2).

4. The device according to claim 2, wherein the electrically conductive element (3) spans across an entire length of the first end of the at least one functional tray (2) and extends along at least a side portion of the first and the second side edges of the at least one functional tray (2).

5. The device according to claim 2, wherein the electrically conductive element (3) is fixed to the at least one functional tray (2) in at least one of an interlocking, a force-fitting and a cohesive manner.

6. The device according to claim 2, wherein the electrically conductive element (3) is at least one of coated onto or integral with the at least one functional tray (2) and has one of a U-profile and an angled profile.

7. The device according to claim 2, wherein at least one further electrically conductive element (3) is fixed to the door of the housing (1) and is positioned on the door to be located adjacent the first end face of the at least one functional tray (2) when the door is in the closed position.

8. The device according to claim 2, wherein a distance between the electrically conductive element (3) and at least one of the housing (1) and an adjacent electrically conducting element (3) is approximately less than 500 mm.

9. The device according to claim 2, wherein the housing (1) and the at least one functional tray (2) each have a connecting element which engage with one another to produce an electrical connection.

10. The device according to claim 2, wherein the electrically conductive element (3) have connecting elements which maintain an equipotential difference.

11. The device according to claim 2, wherein the at least one functional tray (2) has at least one of elements and regions which are arranged within an alternating electromagnetic field generated by the at least one induction coil (4) and inductively heated.

12. The device according to claim 2, wherein at least one of a sensor element and a sensor switching element is at least one of arranged within and on the at least one functional tray (2).

13. The device according to claim 12, wherein the at least one sensor element and the sensor switching element is one of a temperature sensor and temperature sensor switching element (21).

14. The device according to claim 2, wherein at least one flat element is inserted into the interior of the housing (1) for shielding electromagnetic waves.

15. The device as claimed in claim 14, wherein the flat shielding element is one of connected to the at least one functional tray (2) or is integral therewith.

16. The device according to claim 14, wherein the flat shielding element is formed from one of a ferritic material and a metallic material.

17. The device according to claim 2, the at least one functional tray (2) has heat-conducting elements that contact an interior face of the housing (1).

18. The device according to claim 2, wherein the at least one induction coil (4) or the at least one functional tray (2) is held by at least one thermally stable flat element.

19. The device according to claim 18, wherein the at least one thermally stable flat element is formed substantially from mica.

20. The device according to claim 2, wherein the first and the second side edges of the at least one functional tray (2) or the first and the second side walls of the housing (1) have profiled elements (6) for guiding and positioning insert elements (5), and the insert elements (5) have profiles (7) that are complimentary to the profiled elements (6).

21. The device according to claim 20, wherein the profiled elements (6) and the profiles (7) differ at two opposite sides.

22. The device according to claim 2, wherein the at least one functional tray (2) support at least one insert element (5) and the at least one insert element (5) has receptacles (8) which support containers to be heated, the receptacles (8) are located on the insert element (5) such that the containers to be heated are suitably positioned relative to the at least one induction coil (4).

23. The device according to claim 22, wherein the at least one insert element (5) comprises cavities (9, 9') for generating steam, and the cavities (9, 9') are one of formed within the alternating electromagnetic fields of the induction coil (4) or are insertable into the insert elements (5).

24. The device according to claim 22, wherein the at least one insert element (5) is closed by a cover (10).

25. The device according to claim 22, wherein the at least one insert element (5) and a cover (10) are at least one of temporarily connected in an interlocking manner and stacked one above an other.

26. The device according to claim 23, wherein the insert elements (5) have a cover (10) with channels (11) which conduct steam from the cavities (9) to the containers to be heated.

27. The device according to claim 22, wherein the insert elements (5) have elements (12) or regions (12) which are inductively heated and positioned within the alternating electromagnetic field of induction coils (4).

28. The device according to claim 24, wherein at least one of the insert elements (5) and the covers (10) have at least one identification coding element (23).

29. The device according to claim 2, wherein the device further comprises a refrigeration system (15) with at least one connection for supplying a cooling medium to the at least one functional tray (2).

30. The device according to claim 29, wherein the supply of the cooling medium to the at least one functional tray (2) is controllable by the device.

31. The device according to claim 2, wherein the device further comprises at least one steam delivery line for supplying steam, which is produced externally, to the at least one functional tray (2).

* * * * *